United States Patent
Swab et al.

(10) Patent No.: US 8,118,052 B2
(45) Date of Patent: Feb. 21, 2012

(54) METHOD OF FORMING A POLYURETHANE FOAM

(75) Inventors: John H. Swab, Simpsonville, SC (US); Matthew C. Dunlap, Taylor, MI (US); Thomas M. Suggs, Southgate, MI (US); Donald E. Weber, Livonia, MI (US)

(73) Assignee: BASF Corporation, Florham Park, NJ (US)

( * ) Notice: Subject to any disclaimer, the term of this patent is extended or adjusted under 35 U.S.C. 154(b) by 686 days.

(21) Appl. No.: 12/210,031

(22) Filed: Sep. 12, 2008

(65) Prior Publication Data

US 2010/0069517 A1      Mar. 18, 2010

(51) Int. Cl.
*B67D 7/72* (2010.01)
(52) U.S. Cl. ........ 137/208; 137/209; 137/504; 239/571; 239/583
(58) Field of Classification Search ............ 137/208, 137/206, 209, 15.19, 494, 497, 500–504; 239/570, 571, 583
See application file for complete search history.

(56) References Cited

U.S. PATENT DOCUMENTS

| | | | |
|---|---|---|---|
| 334,011 A | 1/1886 | Franklin | |
| 2,411,392 A | 11/1946 | Saville | |
| 2,504,117 A | 4/1950 | Downs | |
| 2,872,939 A * | 2/1959 | Terry | 137/504 |
| 3,741,242 A * | 6/1973 | Hansen et al. | 137/504 |
| 3,795,364 A | 3/1974 | Kattner | |
| 3,882,052 A | 5/1975 | Raynor et al. | |
| 4,138,454 A | 2/1979 | Harmon et al. | |
| 4,234,007 A | 11/1980 | Titone et al. | |
| 4,383,552 A | 5/1983 | Baker | |
| 4,913,317 A | 4/1990 | Wernicke | |
| 5,004,125 A | 4/1991 | Standlick | |
| 5,086,949 A | 2/1992 | Vulpitta et al. | |
| 5,104,006 A * | 4/1992 | Brown | 222/145.1 |
| 5,180,082 A | 1/1993 | Cherfane | |
| 5,246,143 A | 9/1993 | Cherfane | |
| 5,318,637 A | 6/1994 | Wernicke | |
| 5,360,831 A | 11/1994 | Lidy et al. | |

(Continued)

FOREIGN PATENT DOCUMENTS

DE    2806102 A1    2/1978

(Continued)

OTHER PUBLICATIONS

English language abstract for FR 2535435 extracted from espacenet.com database, dated Mar. 24, 2011, 1 page.

(Continued)

*Primary Examiner* — Craig Schneider
(74) *Attorney, Agent, or Firm* — Howard & Howard Attorneys PLLC

(57) ABSTRACT

A method of forming polyurethane foam from a resin component and an isocyanate component includes the use of at least one control valve controlling a flow rate of at least one of the resin component and the isocyanate component. The method includes connecting lines having at least a 1 inch diameter to a housing of the control valve. The method also includes coupling a source of gas pressure to the line. At least one of the resin component and the isocyanate component is pressurized with the source of gas pressure to move the resin and/or isocyanate component through the line and into the flow control device at a flow rate of between 5 and 70 gallons per minute.

25 Claims, 4 Drawing Sheets

U.S. PATENT DOCUMENTS

| | | | |
|---|---|---|---|
| 5,388,764 | A | 2/1995 | Moses |
| 5,403,088 | A | 4/1995 | Killmer et al. |
| 5,411,321 | A * | 5/1995 | Harness .................... 303/7 |
| 5,878,766 | A | 3/1999 | Dekhtyar |
| 5,950,875 | A | 9/1999 | Lee et al. |
| 6,534,556 | B2 | 3/2003 | Lacarte et al. |
| 6,688,319 | B2 | 2/2004 | Trantham et al. |
| 6,797,736 | B1 | 9/2004 | Smiecinski et al. |
| 7,156,120 | B2 | 1/2007 | Cherfane et al. |
| 7,350,672 | B1 | 4/2008 | Gerich |
| 7,377,404 | B2 | 5/2008 | Cherfane |
| 7,717,059 | B2 | 5/2010 | Wanthal et al. |
| 7,954,673 | B2 | 6/2011 | Kosmyna et al. |
| 2003/0150872 | A1 | 8/2003 | Huber et al. |
| 2004/0124268 | A1 | 7/2004 | Frazier et al. |
| 2005/0103889 | A1 | 5/2005 | Langeman |
| 2006/0076064 | A1 | 4/2006 | Carter et al. |
| 2007/0170282 | A1 * | 7/2007 | McMichael .................... 239/413 |
| 2010/0065130 | A1 | 3/2010 | Swab et al. |
| 2010/0065768 | A1 | 3/2010 | Swab et al. |
| 2011/0121034 | A1 | 5/2011 | Swab et al. |

FOREIGN PATENT DOCUMENTS

| | | |
|---|---|---|
| DE | 2934825 A1 | 8/1979 |
| EP | 1353254 A2 | 10/2003 |
| EP | 1712821 A1 | 10/2006 |
| FR | 2535435 A1 | 5/1984 |

OTHER PUBLICATIONS

The Dow Chemical Company, "Dow Polyurethane Systems Products"; The Dow Chemical Company website; www.dow.com/pusystems/product/deltagun.htm, accessed Jan. 28, 2008.

BASF Corporation, "BASF Polyurethanes—Building and Construction"; The BASF Corporation website; www.basf.com/urethanechemicals,Specialty—Systems/equipment—bc.html, accessed Jan. 28, 2008.

English translation of DE 2934825, extracted from espacenet.com, 17 pages.

English translation of DE 2806102 A1, extracted from espacenet.com, 22 pages.

PCT International Search Report PCT/EP2010/067929, dated Mar. 17, 2011, 6 pages.

* cited by examiner

METHOD OF FORMING A POLYURETHANE FOAM

BACKGROUND OF THE INVENTION

1. Field of the Invention

The present invention generally relates to a method of forming a polyurethane foam from a resin component and an isocyanate component using at least one control valve controlling a flow rate of at least one of the resin component and the isocyanate component.

2. Description of the Related Art

Chemical foam compositions, such as polyurethane foams, are presently well known and used in a number of different applications. Polyurethane foams are useful in such applications as thermal insulation, marine floatation, coatings, and packaging. Polyurethane foams are formed by the mixture of a resin component and an isocyanate component.

The resin component and the isocyanate component are separately stored in tanks until use. The resin and isocyanate components are mixed in a foam dispensing apparatus and are dispensed therefrom as polyurethane foam. The tanks storing the resin component and the isocyanate component and the foam dispensing apparatus are pressurized to drive the resin and isocyanate components from the tanks and through the foam dispensing apparatus.

The tanks and the foam dispensing apparatus are pressurized by either a low pressure system or a high pressure system. The low pressure system uses gas pressure to pressurize the tanks and the foam dispensing apparatus. The low pressure system operates in a pressure range of 100-500 psi (pounds per square inch) and creates a flow rate of 0.4-5 gpm (gallons per minute) for each of the resin and isocyanate components, i.e., the low pressure system can dispense polyurethane foam at a flow rate of 6-10 gpm. Because the low pressure system is pressurized by gas and operates at relatively low pressures, the low pressure system is relatively small and therefore relatively easy to transport and maneuver. In addition, the low pressure system is relatively inexpensive to manufacture. However, the flow rate of the polyurethane being dispensed from the foam dispensing apparatus is relatively low, which disadvantageously increases the amount of time to dispense a given amount of polyurethane foam.

The high pressure system operates in a pressure range of 1500 to 6000 psi and creates a flow rate of each of the resin and isocyanate components of 4-50 gpm, i.e., the high pressure system can dispense polyurethane foam at 8-100 gpm. However, high pressure systems include large pumps and a large amount of relatively thick pipes. As a result, high pressure systems are disadvantageously large and therefore are difficult to transport and maneuver. In addition, high pressure systems are very expensive relative to low pressure systems.

It would be advantageous to develop a method which allows for the dispersion of polyurethane foam at a relatively high flow rate while maintaining the foam dispensing apparatus at a relatively small size and a relatively inexpensive cost to manufacture.

SUMMARY OF THE INVENTION AND ADVANTAGES

The present invention includes a method of forming a polyurethane foam from a resin component and an isocyanate component using at least one control valve controlling a flow rate of at least one of the resin component and the isocyanate component. The control valve has a housing defining an inlet chamber and an outlet chamber spaced from each other. The control valve has a flow control device defining a fluid passage in fluid communication with the inlet and outlet chambers. The method comprises connecting lines having at least a 1 inch diameter to the housing at the inlet chamber and at the outlet chamber. The method further comprises coupling a source of gas pressure to the line having at least a 1 inch diameter at the inlet chamber. The method further comprises pressurizing the at least one of the resin component and the isocyanate component with the source of gas pressure to move the at least one of the resin component and the isocyanate component through the line having at least a 1 inch diameter at the inlet chamber and through the flow control device at between 5 and 70 gallons per minute.

Accordingly, the method advantageously results in a flow rate of 5-70 gpm for at least one of the resin component and the isocyanate component. The method is extremely versatile because the range of flow rates between 5 and 70 gpm can be useful in many different types of applications. In addition, because the pressure is derived from a source of gas pressure, the method advantageously involves relatively small and inexpensive equipment while providing the flow rates of relatively large and expensive equipment.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
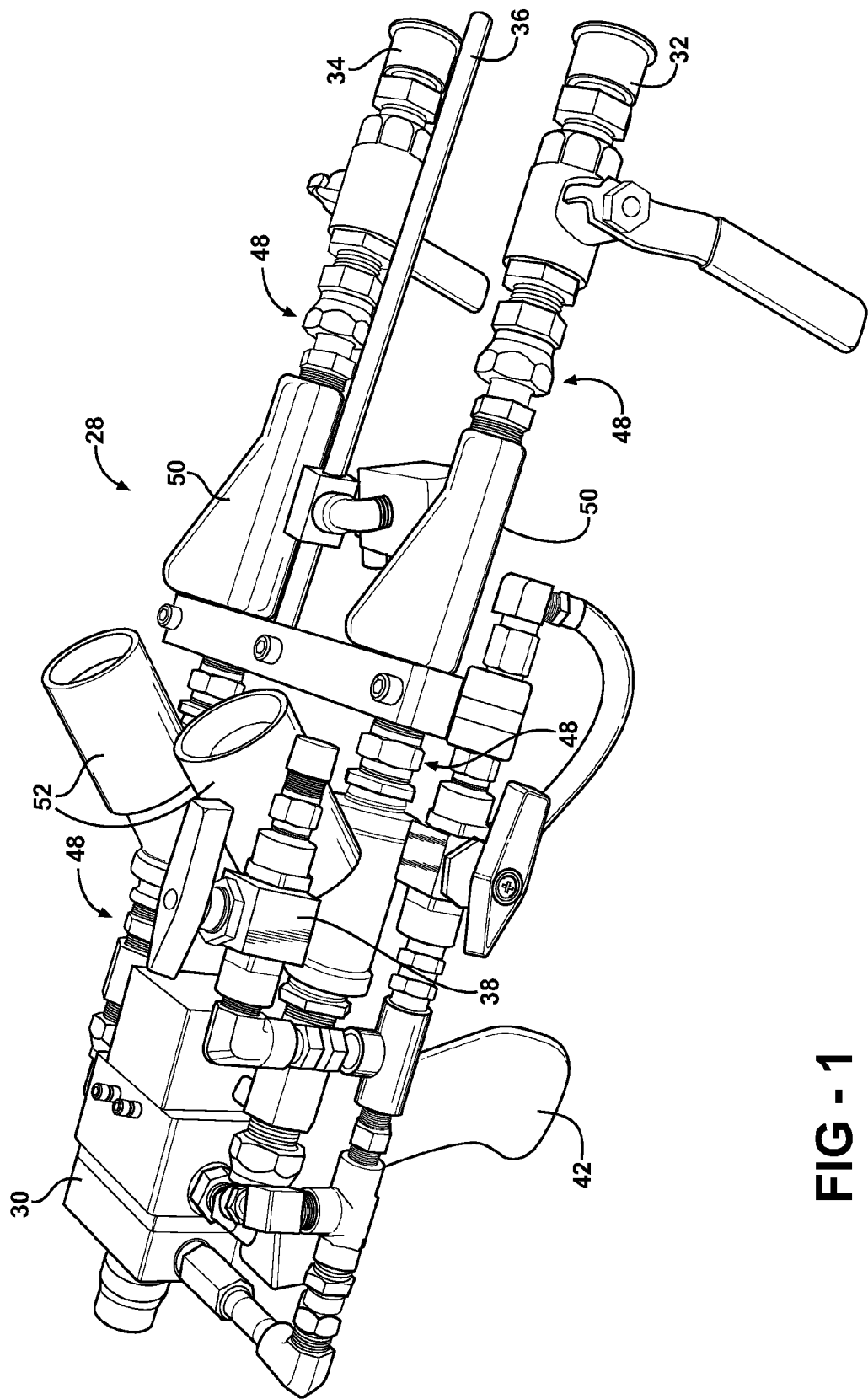
FIG. 1 is a perspective view of a foam dispensing apparatus.

Referring to the Figures, wherein like numerals indicate like parts throughout the several views, a foam dispensing system 20 is generally shown. The foam dispensing system 20 is a two component system for handling a resin component and an isocyanate component. The foam dispensing system 20 mixes the resin and isocyanate components and dispenses the mixture therefrom. With respect to the polyurethane foam, the resin and isocyanate components are rapidly mixed together. A rapid cross-linking reaction and foam expansion commences, which ultimately yields the low density but relatively high load bearing rigid polyurethane foam. The application of the polyurethane foam can, for example, be used for thermal insulation such as for appliances or buildings, marine floatation, coatings, and packaging. It should be appreciated that the resin component and the isocyanate component can include foaming agents, curing agents, catalysts, accelerators, as well as other modifying additives. It should be appreciated that in other applications, the first fluid, the second fluid, a tertiary fluid, and subsequent fluids may comprise other materials.

The isocyanate component may include, but is not limited to, isocyanates, diisocyanates, polyisocyanates, biurets of isocyanates and polyisocyanates, isocyanurates of isocyanates and polyisocyanates, and combinations thereof. In one embodiment, the isocyanate component includes an n-functional isocyanate. "n" may be a number from 2 to 5, from 2 to 4, or from 3 to 4. It is to be understood that n may be an integer or may have intermediate values from 2 to 5. The isocyanate component may include an isocyanate selected from the group of aromatic isocyanates, aliphatic isocyanates, and combinations thereof. In another embodiment, the isocyanate component includes an aliphatic isocyanate such as hexamethylene diisocyanate, H12MDI, and combinations thereof. If the isocyanate component includes an aliphatic isocyanate, the isocyanate component may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. The isocyanate component may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof.

Alternatively, the isocyanate component may include an aromatic isocyanate. If the isocyanate component includes an aromatic isocyanate, the aromatic isocyanate may correspond to the formula $R'(NCO)_z$ wherein $R'$ is aromatic and $z$ is an integer that corresponds to the valence of $R'$. Preferably, $z$ is at least two. Suitable examples of aromatic isocyanates include, but are not limited to, tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5, 5'-diphenylmetha tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. Alternatively, the aromatic isocyanate may include a triisocyanate product of m-TMXDI and 1,1,1-trimethylolpropane, a reaction product of toluene diisocyanate and 1,1,1-trimethyolpropane, and combinations thereof. In one embodiment, the isocyanate component includes a diisocyanate selected from the group of methylene diphenyl diisocyanates, toluene diisocyanates, hexamethylene diisocyanates, H12MDIs, and combinations thereof.

The isocyanate component may have any % NCO content and any viscosity. The isocyanate component may also react with the resin and/or chain extender in any amount, as determined by one skilled in the art. Preferably, the isocyanate component and the resin and/or chain extender are reacted at an isocyanate index from 15 to 900, more preferably from 95 to 130, and alternatively from 105 to 130.

The resin component of the instant invention may include one or more of a polyether polyol, a polyester polyol, and combinations thereof. As is known in the art, polyether polyols are typically formed from a reaction of an initiator and an alkylene oxide. Preferably, the initiator is selected from the group of aliphatic initiators, aromatic initiators, and combinations thereof. In one embodiment, the initiator is selected from the group of ethylene glycol, propylene glycol, dipropylene glycol, butylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, butenediol, butynediol, xylylene glycols, amylene glycols, 1,4-phenylene-bis-beta-hydroxy ethyl ether, 1,3-phenylene-bis-beta-hydroxy ethyl ether, bis-(hydroxy-methyl-cyclohexane), thiodiglycol, glycerol, 1,1,1-trimethylolpropane, 1,1,1-trimethylolethane, 1,2,6-hexanetriol, α-methyl glucoside, pentaerythritol, sorbitol, aniline, o-chloroaniline, p-aminoaniline, 1,5-diaminonaphthalene, methylene dianiline, the condensation products of aniline and formaldehyde, 2,3-, 2,6-, 3,4-, 2,5-, and 2,4-diaminotoluene and isomeric mixtures, methylamine, triisopropanolamine, ethylenediamine, 1,3-diaminopropane, 1,3-diaminobutane, 1,4-diaminobutane, propylene diamine, butylene diamine, hexamethylene diamine, cyclohexalene diamine, phenylene diamine, tolylene diamine, xylylene diamine, 3,3'-dichlorobenzidine, 3,3'- and dinitrobenzidine, alkanol amines including ethanol amine, aminopropyl alcohol, 2,2-dimethyl propanol amine, 3-aminocyclohexyl alcohol, and p-aminobenzyl alcohol, and combinations thereof. It is contemplated that any suitable initiator known in the art may be used in the present invention.

Preferably, the alkylene oxide that reacts with the initiator to form the polyether polyol is selected from the group of ethylene oxide, propylene oxide, butylene oxide, amylene oxide, tetrahydrofuran, alkylene oxide-tetrahydrofuran mixtures, epihalohydrins, aralkylene oxides, and combinations thereof. More preferably, the alkylene oxide is selected from the group of ethylene oxide, propylene oxide, and combinations thereof. Most preferably, the alkylene oxide includes ethylene oxide. However, it is also contemplated that any suitable alkylene oxide that is known in the art may be used in the present invention.

The polyether polyol may include an ethylene oxide cap of from 5 to 20% by weight based on the total weight of the polyether polyol. It is to be understood that the terminology "cap" refers to a terminal portion of the polyether polyol. Without intending to be bound by any particular theory, it is believed that the ethylene oxide cap promotes an increase in a rate of the reaction of the polyether polyol and the isocyanate.

The polyether polyol may also have a number average molecular weight of from 18 to 10,000 g/mol. Further, the polyether polyol may have a hydroxyl number of from 15 to 6,250 mg KOH/g. The polyether polyol may also have a nominal functionality of from 2 to 8. Further, further, the polyether polyol may also include an organic functional group selected from the group of a carboxyl group, an amine group, a carbamate group, an amide group, and an epoxy group.

Referring now to the polyester polyols introduced above, the polyester polyols may be produced from a reaction of a dicarboxylic acid and a glycol having at least one primary hydroxyl group. Suitable dicarboxylic acids may be selected from the group of, but are not limited to, adipic acid, methyl adipic acid, succinic acid, suberic acid, sebacic acid, oxalic acid, glutaric acid, pimelic acid, azelaic acid, phthalic acid, terephthalic acid, isophthalic acid, and combinations thereof. Suitable glycols include, but are not limited to, those described above.

The polyester polyol may also have a number average molecular weight of from 80 to 1500 g/mol. Further, the polyester polyol may have a hydroxyl number of from 40 to 600 mg KOH/g. The polyester polyol may also have a nominal functionality of from 2 to 8. Further, further, the polyester polyol may also include an organic functional group selected from the group of a carboxyl group, an amine group, a carbamate group, an amide group, and an epoxy group.

It should be appreciated that the resin component can include additives. The additives may be selected from the group of chain extenders, anti-foaming agents, processing additives, plasticizers, chain terminators, surface-active agents, adhesion promoters, flame retardants, anti-oxidants, water scavengers, fumed silicas, dyes, ultraviolet light stabilizers, fillers, thixotropic agents, silicones, transition metals, catalysts, blowing agents, surfactants, cross-linkers, inert diluents, and combinations thereof. The additives may be included in any amount as desired by those of skill in the art.

Figure 2:
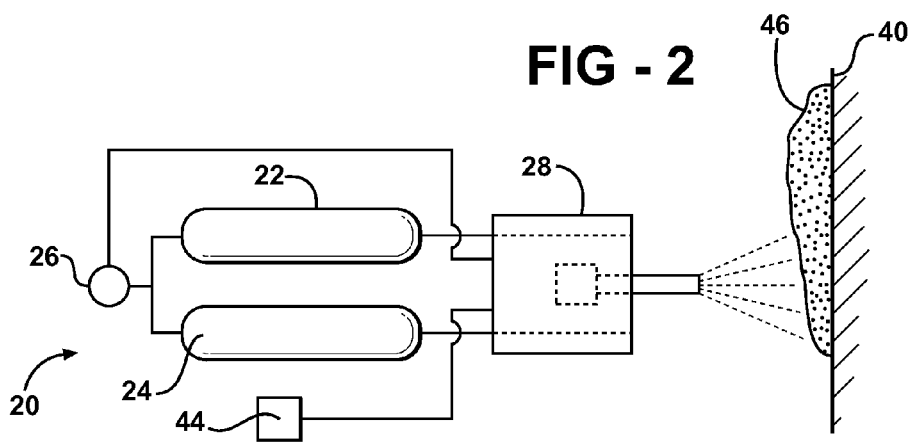
FIG. 2 is a schematic view of a foam dispensing system including the foam dispensing apparatus.

As shown in FIG. 2, the foam dispensing system 20 includes a first tank 22 for storing the first component, a second tank 24 for storing the second component, a source of gas pressure 26 in communication with the first and second tanks 22, 24 for pressurizing the first and second tanks 22, 24, and a foam dispensing apparatus 28 for mixing and dispensing the first and second components. The source of gas pressure 26 can be, for example, a tank of compressed air. However, it should be appreciated that the source of gas pressure 26 can include a gas other than air.

Referring to FIG. 1, the foam dispensing apparatus 28 includes a dispensing head 30, a first supply portion 32 for supplying the first component to the dispensing head 30, a second supply portion 34 for supplying the second component to the dispensing head 30, a gas supply portion 36 for supplying gas to the dispensing head 30, and a cleansing fluid supply portion 38 for supplying cleansing fluid to the dispensing head 30.

The dispensing head 30 mixes the first and second components together and dispenses the mixture of the first and second components to form the polyurethane foam. As shown in FIG. 2, the dispensing head 30 can direct a layer 46 of polyurethane foam onto a substrate 40. The amount of time that polyurethane foam is dispensed from the dispensing head 30 can be controlled manually or electronically.

The gas supply portion 36 is in fluid communication with the source of gas pressure 29. The gas supply portion 36 supplies pressurized gas to the dispensing head 30 for use in dispensing the polyurethane foam from the dispensing head 30. A step-down (not shown) is typically disposed between the gas supply portion 36 and the source of gas pressure 29 to decrease the pressure of the gas to a suitable magnitude. Alternatively, a separate pressurized gas line (not shown), such as a line from a manufacturing plant often referred to as "plant air," is connected to the dispensing head 30 for use in dispensing the polyurethane foam from the dispensing head 30. In any event, the gas is preferably dry.

The dispensing head 30 can include a nozzle or a mix tube (not shown) for mixing the resin component and the isocyanate component. The dispensing head 30 can, for example, include a handle 42 for a user to grasp and the handle permits the user to conveniently and easily manipulate and operate the foam dispensing apparatus 28.

The cleansing fluid supply portion 38 is connected to a cleansing fluid source 44 such as a canister holding cleansing fluid. The cleansing fluid can, for example, be water. However, it should be appreciated that the cleansing fluid may be any type of material without departing from the nature of the present invention. The cleansing fluid supply portion 38 supplies the cleansing fluid to the dispensing head 30 for purging, i.e., flushing, any of the first component and the second component from the dispensing head 30 after use, thereby cleaning the dispensing head 30 and ensuring proper functioning of the dispensing head 30 during future uses.

The first supply portion 32 regulates the flow rate of the resin component and the second supply portion 34 regulates the flow rate of the isocyanate component. The first and second supply portions 32, 34 regulate flow rates such that the resin component and the isocyanate component are mixed at a proper ratio and are mixed under rapid and sufficient impingement conditions to obtain an acceptable product.

The first and second supply portions 32, 34 are typically mirror images of each other and, for simplicity, the following description is applicable to both of the first and second supply portions 32, 34. The supply portion 32, 34 includes lines 48 connecting a control valve 50 to the dispensing head 30. As set forth in greater detail below, the control valve 50 is in-line and can be adjusted without disassembling from the lines 48. It should be appreciated that the control valve 50 of the subject invention may be incorporated into other production systems requiring the discharge of a fluid at a precise flow rate. Therefore, it should be appreciated that the control valve 50 of the subject invention is not limited to use in the foam dispensing apparatus 28 shown in FIG. 1 and described above, and may be utilized in other types of production systems. It should be appreciated that the control valve 50 can be omitted from the first supply portion 32 or the second supply portion 34 such that the flow rate of only one of the resin component and the isocyanate component is controlled.

The lines 48 can include an assortment of pipes, pipe fittings, ball valves, check valves, and hoses to properly handle materials flowing through the supply portion 32, 34. The pipes and the pipe fittings define an inner diameter. The inner diameter is typically at least one inch. It should be appreciated that the pipes, pipe fittings, ball valves, and check valves shown in the Figures are disclosed for exemplary purposes and in addition to or in the alternative to those described herein and shown in the Figures, the lines 48 can include other types of tubing, conduit, etc., without departing from the nature of the present invention. The supply portion 32, 34 also includes a thermometer assembly 52 including a thermometer well and a thermometer for measuring the temperature of the component in the supply portion 32, 34.

Figure 3:
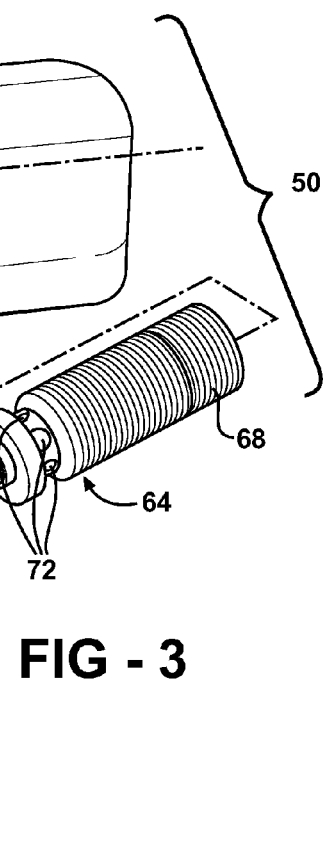
FIG. 3 is an exploded view of a flow control valve of the foam dispensing apparatus.
Figure 4:
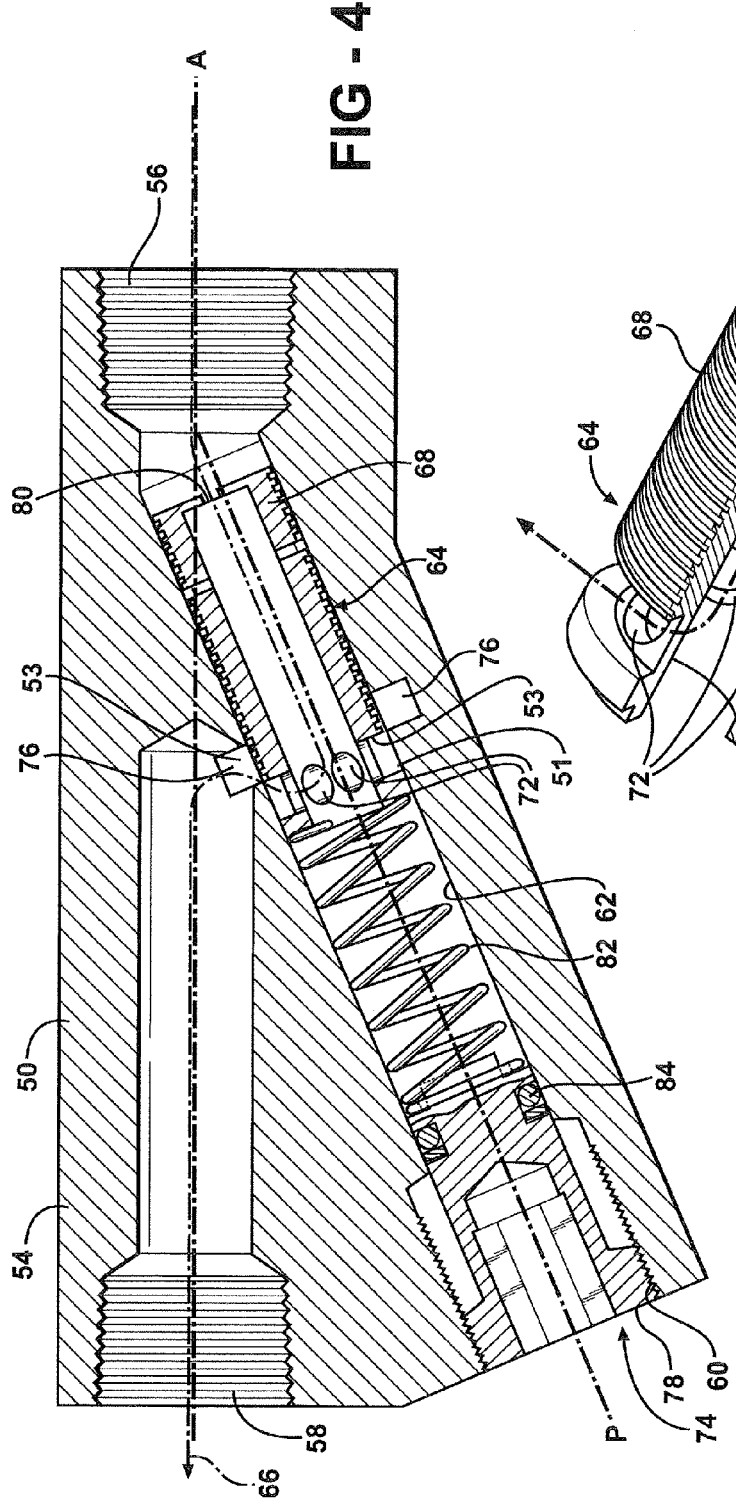
FIG. 4 is cross-sectional view of the control valve.

The control valve 50 regulates a flow rate of the component through the control valve 50. Referring to FIGS. 3 and 4, the control valve 50 comprises a housing 54. Preferably, the housing 54 is manufactured from aluminum. However, it should be appreciated that the housing 54 may be manufactured from some other material capable of conducting the component therethrough under pressure. The material utilized for the housing 54 is typically chemically resistant to the specific component flowing therethrough.

The housing 54 defines an inlet chamber 56 and an outlet chamber 58. The outlet chamber 58 is spaced from the inlet chamber 56 and is disposed along an outlet axis A. The inlet chamber 56 and the outlet chamber 58 are configured to accept the line 48. The inlet and outlet chambers 56, 58 are typically configured to include a cross-section having a circular shape defining a diameter. The diameter is typically at least a one inch diameter. It should be appreciated that the size of the inlet chamber 56 and the outlet chamber 58 may vary without departing from the nature of the present invention. For example, the inlet and outlet chambers 56, 58 are configured to accept a one inch (1") NPT fitting. It should be appreciated that the connection type of the inlet and outlet chambers 56, 58 may vary from the NPT threads described above and may include, among others, SAE, JIC, ISO-G, flange style and compression fittings as well as manifold options.

The housing 54 further defines an opening 60. A bore 62 extends from the opening 60 into the housing 54, and generally into the inlet chamber 56. The bore 62 extends along a plane P, which intersects the outlet axis A. Typically, the plane P is angled relative to the outlet axis A. It should be appreciated that the bore 62 extends along an axis that is defined by and coplanar with the plane P. For clarity, plane P is shown in the Figures as a line. However, it is to be appreciated that the plane P is two-dimensional, and as such, extends into and out of the Figures. Therefore, it should be appreciated that while the axis along which the bore extends may not intersect the outlet axis A, the plane P along which the bore extends does intersect the outlet axis A, i.e., the bore 62 may be laterally offset from the outlet axis A while the plane P along which the bore 62 extends still intersect the outlet axis A. The plane P and the outlet axis A define an angle therebetween with the opening of the housing 54 laterally offset from outlet axis A.

The plane P and the outlet axis A intersect within the housing 54 shown in the Figures. However, it should be appreciated that the plane P and the outlet axis A may intersect at a point located outside of the housing 54. It should also be appreciated that the inlet chamber 56 and the outlet chamber 58 may or may not be in-line on a coincident outlet axis A, i.e., at a 0° offset. The present invention works equally well with any non-coincident outlet axis A for inlet chamber 56 and outlet chamber 58. It should also be appreciated that the plane P and the outlet axis A can intersect at any angle from 0°, i.e., inline, to 180°, i.e., reverse direction U-shaped flow path. Also, the plane P and the outlet axis A meet and intersect even at intermediate angles.

A flow control device 64 is disposed within the bore 62. The flow control device 64 defines a fluid passage 66. The fluid passage 66 interconnects the inlet chamber 56 and the outlet chamber 58. The flow control device 64 controls the fluid flow rate of the component between the inlet chamber 56 and the outlet chamber 58.

Figure 5:
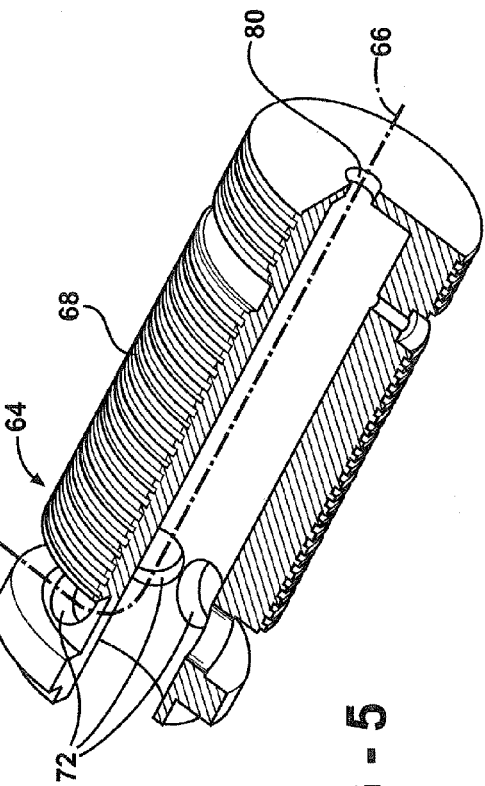
FIG. 5 is a sectional view of a piston of the control valve.
Figure 6:
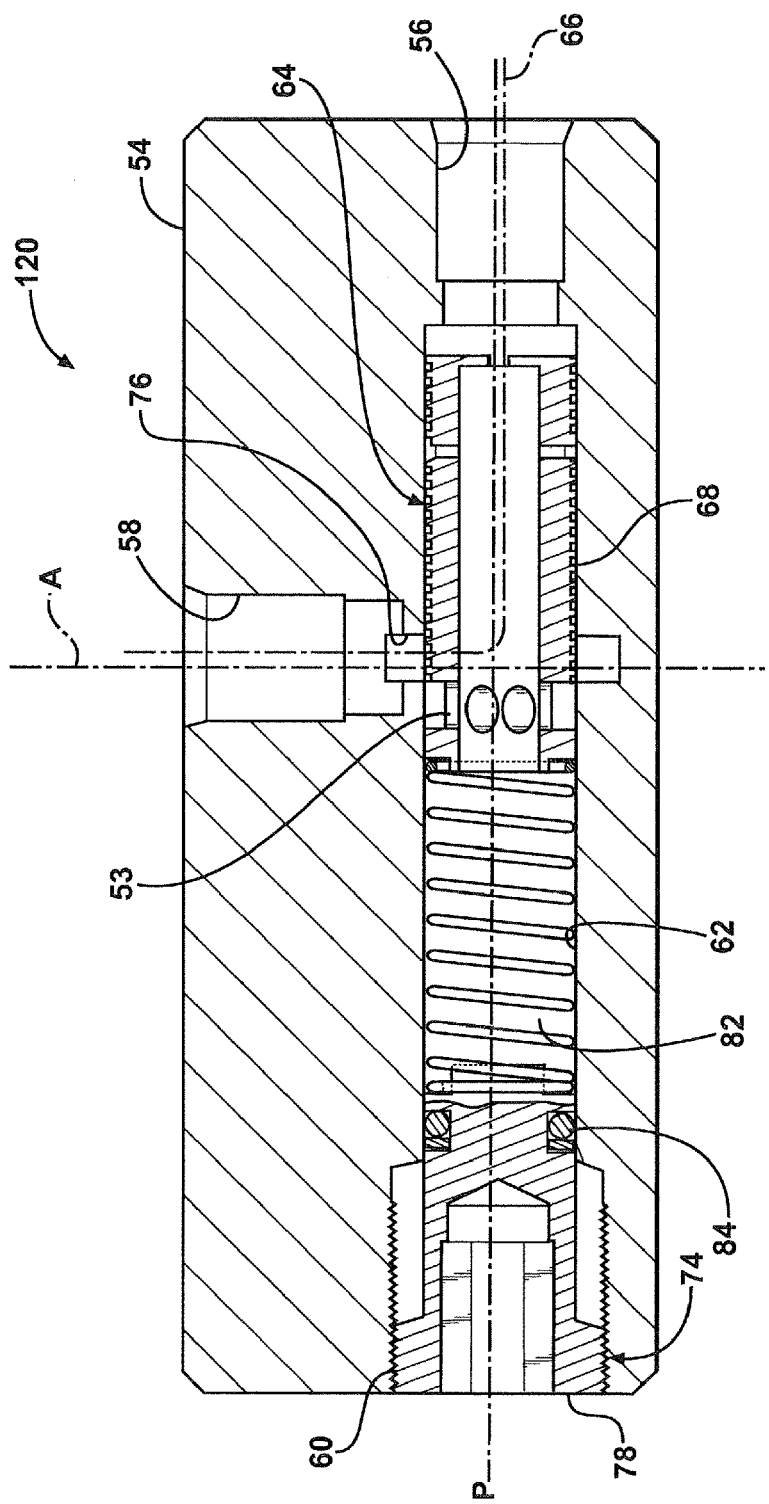
FIG. 6 is a cross-sectional view of an alternative embodiment of the control valve.

Referring to FIGS. 3-5, the flow control device 64 includes a piston 68. The piston 68 is moveable within the bore 62 along the plane P. The piston 68 includes a first end and a second end. The first end is disposed adjacent the inlet chamber 56 and defines an aperture 80. The second end is disposed opposite the first end along the plane P and defines at least one orifice 72. The second end typically defines a plurality of orifices 72 and an annular flow path 51. The inlet chamber 56 is in fluid communication with the aperture 80, the aperture 80 is in fluid communication with the at least one orifice 72, the at least one orifice 72 is in fluid communication with the annular flow path 51, and the annular flow path 51 is in fluid communication with the outlet chamber 58. The fluid component flows from the inlet chamber 56, through the aperture 80, the orifice 72, and the annular flow path of the piston 68, into the outlet chamber 58. Typically, the aperture 80 is in fluid communication with all of the orifices 72.

The aperture 80 includes a pre-determined cross-sectional area for regulating the fluid flow rate of the fluid component. Preferably, the aperture 80 includes a circular cross-section having a pre-determined diameter. However, it should be appreciated that the cross-sectional shape of the aperture 80 may vary, and that it is the cross-sectional area, the depth, and the contour of the leading and lagging edges that determines the fluid flow rate through the piston 68. It should be appreciated that the piston 68 could also be comprised of two or more separate components such as a common piston body and an orifice module, with the various apertures 80, assembled together into one assembly.

Referring to FIGS. 3 and 4, the outlet chamber 58 typically includes at least one entrance port 76, but may also define a plurality of entrance ports 76. The entrance port 76 is in fluid communication with the annular flow path 51 and the annular flow path 51 is in fluid communication with at least one orifice 72. The interface between the annular flow path 51 relative to the entrance port 76 defines a variable valve orifice 53. The variable valve orifice 53 created by the position of the annular flow path 51 relative to the entrance port 76 in the control valve 50 may be defined by a complete and uninterrupted ring whereas other devices typically utilize at least one partially blocked orifice usually placed radially around the circumference. Utilizing the complete ring shaped variable orifice maximizes the flow area for a given stroke, decreases the travel required to adjust the variable valve orifice 53 and therefore increase the sensitivity of the control valve 50. The annular flow path 51 and the entrance port 76 extend transverse to the plane P and the outlet axis A to intersect the outlet chamber 58. The fluid component flows from the orifice 72, through the annular flow path 51, through the variable valve orifice 53, through the entrance port 76 and into the outlet chamber 58.

An adjustment mechanism 74 is coupled to the flow control device 64. The adjustment mechanism 74 adjusts the force against the piston 68 and proportionally the pressure drop across the aperture 80. The aperture 80 of the piston 68 and the applied spring force defines the fluid flow rate through the piston 68 and the adjustment mechanism 74 adjusts or alters the fluid flow rate to fine tune or customize the flow of the fluid component into the outlet chamber 58.

The adjustment mechanism 74 includes a head 78 in threaded engagement with the bore 62, and a spring 82 disposed along the plane P between the head 78 and the piston 68. The spring 82 is disposed within the bore 62 and abuts the piston 68. The head 78 includes a tool engaging recess adjacent the opening 60. The tool engaging recess provides an interface between the head 78 and a tool (not shown) to allow a user to rotate the head 78 about the plane P. It should be appreciated that the head 78 will move along the plane P in response to threaded rotation about the plane P. Preferably, the tool engaging recess includes a hexagonal shape for engagement with an allen wrench. However, it should be appreciated that the tool engaging recess may be configured differently than shown and described herein for engagement with some other tool.

The spring 82 is disposed between the head 78 and the piston 68 to urge the piston 68 along the plane P. In operation, the spring 82 is compressed between the head 78 and the piston 68 in response to the fluid pressure exerted by the component onto the piston 68. Accordingly, it should be appreciated that at a given fluid pressure, the spring 82 is compressed a certain distance along the plane P. The distance the spring 82 is compressed is dependent upon the spring constant of the spring 82. Therefore, varying the spring constant of the spring 82 will alter the flow rate through the control valve 50.

Advancement or retraction of the head 78 within the bore 62 compresses the spring 82 along the plane P and thereby adjusts the force against the piston 68 along the plane P. Accordingly, adjustment of the spring 82 adjusts the force against the piston 68 and therefore across the aperture 80 and the variable valve orifice 53 thus creating a controlled pressure drop across the aperture 80. Moving, i.e., realigning, the annular flow path 51 relative to the entrance port 76 alters the cross-sectional area of the variable valve orifice 53 between the annular flow path 51 and the entrance port 76 through which fluid component may flow. Altering the cross-sectional area between the annular flow path 51 and the entrance port 76 thereby adjusts the pressure drop of the fluid across the variable valve orifice 53. As the fluid flow rate tries to increase, the pressure drop across the aperture 80 increases thus creating a force against the piston 68. The increased force compresses the spring 82 and closes off the variable valve orifice 53 by minute movement of the piston 68 thus creating additional restriction and maintaining a constant flow.

The head 78 typically includes at least one seal 84 for sealing the bore 62. As shown, the seal 84 is disposed circumferentially about the head 78 in sealing engagement with the bore 62. The seal 84 prevents the fluid component from leaking through the bore 62. It should be appreciated that the at least one seal 84 may include multiple seals and/or backup supports as shown. Preferably, the at least one seal 84 includes an annular o-ring gasket. However, it should be appreciated that the seal 84 may include some other type of seal not shown or described herein, and may be located in some other place within the bore 62 to seal the bore 62.

The flow control device 64 and the adjustment mechanism 74 are disposed within the bore 62, with the adjustment mechanism 74 operable through the opening of the bore 62. As described above, the opening is laterally offset from the outlet axis A. Accordingly, the flow control device 64 and the adjustment mechanism 74 are removable from within the bore 62 of the housing 54 through the opening 60. Because the flow control device 64 and the adjustment mechanism 74 are removable through the bore 62, the control valve 50 need not be removed, nor loosened, from the lines 48 connected to the inlet chamber 56 and the outlet chamber 58.

The control valve 50 can include a plurality of interchangeable flow control devices 64. The interchangeable flow control devices 64 are interchangeable in that the flow control valve 50 receives only one of the interchangeable flow control devices 64 at a time and one of the plurality of flow control devices 64 can be removed from the flow control valve 50 and replaced with another of the plurality of flow control valves 64. Each of the plurality of interchangeable flow control devices 64 has a different piston 68. The apertures 80 of each of the plurality of interchangeable pistons 68 includes a different pre-determined cross-sectional area. Accordingly, because the flow rate of the fluid is dependent upon the cross-sectional area of the aperture 80 as described above, the plurality of different pistons 68 provides a plurality of different fluid flow rates, i.e., each piston 68 provides a different fluid flow rate. Once again, because the flow control device 64 and the adjustment mechanism 74 are easily removable through the opening of the bore 62, the plurality of different pistons 68 are easily interchangeable without having to remove any connecting lines 48 connected to the inlet chamber 56 and the outlet chamber 58. It should be appreciated that only one flow control device 64 is shown in the Figures and that each of the plurality of flow control devices can have similar configurations with the exception of the size of the aperture 80.

The present invention also includes a method of forming the polyurethane foam from the resin component and the isocyanate component using at least one flow control device 64. The method includes connecting the line 48, which has at least a 1 inch diameter, to the housing 54 at the inlet chamber 56 and coupling the source of gas pressure 29 to the line 48.

The method further includes pressurizing the at least one of the resin component and the isocyanate component with the source of gas pressure 29 to move the at least one of the resin component and the isocyanate component through the line 48 and into the flow control device 64. Typically, both the resin component and the isocyanate component are pressurized with the source of gas pressure 26. Pressurizing the resin component and/or the isocyanate component includes pressurizing at least one of the first and/or the second tank 22, 24 with the source of gas pressure 29. Typically, the first and second tanks 22 are pressurized to between 100 and 500 pounds per square inch. More specifically, the first and second tanks 22, 24 are typically pressurized to between 220 and 250 pounds per square inch. Foam dispensing systems 20 operating at this relatively low pressure are referred to in industry as a low pressure system. This relatively low pressure can be achieved with gas pressure and typically does not require the use of pumps.

The method further includes adjusting the flow control device 64 to vary the fluid communication between the fluid passage 66 and the inlet and outlet chambers 56, 58 to establish the flow rate of the resin component and/or the isocyanate component to between 5 and 70 gallons per minute. In the scenario where both the resin component and the isocyanate component are pressurized with the source of gas pressure 26, both the resin component and the isocyanate component move through the flow control device 64 at between 5 and 70 gallons per minute. As such, the polyurethane foam exits the dispensing head 30 at between 10 and 140 gallons per minute.

The flow control device 64 is typically adjusted according to the description set forth above. Specifically, adjusting the flow control device 64 includes moving the flow control device 64 transverse to the outlet axis A along the plane P in the bore 62. As set forth above, the flow control device 64 is typically moved by rotating the adjustment mechanism 74 relative to the housing 54 to move the flow control device 64 transversely to the outlet axis A. Due to the configuration described above, the flow control device 64 is adjusted, i.e., moved transversely to the outlet axis A, while the lines 48 are coupled to the inlet and outlet chambers 56, 58, i.e., the flow control device 64 is moved transversely to the outlet axis A.

The method further includes coupling the first interchangeable flow control device 64 with the housing 54 to limit the flow rate through the housing 54 to be within the first range of flow rates. As described above, the first interchangeable flow control device 64 can be coupled to the housing 54 while the lines 48 are coupled to the inlet and outlet chambers 56, 58, i.e., without uncoupling the flow control device 64 from the lines 48. When the first interchangeable flow control device 64 is coupled with the housing 54, the flow control device 64 can be adjusted as described above to adjust, i.e., fine tune, the flow rate of the component through the flow control device 64 within the first range of flow rates.

The method further includes uncoupling the first interchangeable flow control device 64 from the housing 54 and coupling the second interchangeable flow control device 64 with the housing 54 to limit the flow rate through the housing 54 to be within the second range of flow rates. As described above, the first interchangeable flow control device 64 can be uncoupled from the housing 54 and the second interchangeable flow control device 64 can be coupled to the housing 54 while the lines 48 are coupled to the inlet and outlet chambers 56, 58, i.e., without uncoupling the housing 54 from the lines 48. When the second interchangeable flow control device 64 is coupled with the housing 54, the flow control device 64 can be adjusted as described above to adjust, i.e., fine tune, the flow rate of the component through the flow control device 64 within the second range of flow rates.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of forming a polyurethane foam from a resin component and an isocyanate component using at least one control valve controlling a flow rate of at least one of the resin component and the isocyanate component, the control valve having a housing defining an inlet chamber and an outlet chamber spaced from each other with the housing receiving one of a plurality of interchangeable flow control devices each configured to define a fluid passage in fluid communication with the inlet and outlet chambers and each configured to provide a different selected range of flow rates through the flow control device, said method comprising:
connecting lines having at least a 1 inch diameter to the housing at the inlet chamber and at the outlet chamber;
coupling a source of gas pressure to the line having at least a 1 inch diameter at the inlet chamber;
pressurizing the at least one of the resin component and the isocyanate component with the source of gas pressure to move the at least one of the resin component and the isocyanate component through the line having at least a 1 inch diameter at the inlet chamber and through the control valve at between 5 and 70 gallons per minute;
coupling one of the plurality of interchangeable flow control devices with the housing to limit the flow rate through the housing to be within one of the selected ranges of flow rates; and
adjusting the flow control device relative to the housing to vary the fluid communication between the fluid passage and at least one of the inlet and outlet chambers to control the flow rate of the at least one of the resin component and the isocyanate component.

2. A method as set forth in claim 1 wherein the outlet chamber is disposed along an outlet axis and the housing further defines a bore receiving the flow control device extending along a plane intersecting the outlet axis and wherein adjusting the flow control device is further defined as moving the flow control device transverse to the outlet axis along the plane in the bore.

3. A method as set forth in claim 2 further including an adjustment mechanism threadedly engaged with the housing in the bore and coupled to the flow control device and wherein adjusting the flow control device is further defined as rotating the adjustment mechanism relative to the housing to move the flow control device transversely to the outlet axis.

4. A method as set forth in claim 2 wherein adjusting the flow control device is further defined as moving the flow control device transversely to the outlet axis while the lines are coupled to the inlet and outlet chambers.

5. A method as set forth in claim 1 further including uncoupling one of the interchangeable flow control devices from the housing and coupling another of the interchangeable flow control devices with the housing to limit the flow rate through the housing to be within another of the selected range of flow rates.

6. A method as set forth in claim 5 wherein uncoupling one of the interchangeable flow control devices and coupling another of the interchangeable flow control devices are performed while the lines are coupled to the inlet and outlet chambers.

7. A method as set forth in claim 1 wherein adjusting the flow control device is further defined as adjusting the flow rate of the flow control device within the selected range of flow rates.

8. A method as set forth in claim 7 further including an adjustment mechanism threadedly engaged with the housing and coupled to one of the interchangeable flow control device when one of the interchangeable flow control device is coupled with the housing and wherein adjusting the flow control device is further defined as rotating the adjustment mechanism relative to the housing to adjust the flow rate within the selected range of flow rates.

9. A method as set forth in claim 1 wherein the at least one control valve is further defined as a first control valve controlling the flow rate of the resin component and a second control valve controlling the flow rate of the isocyanate component and wherein adjusting the flow control device is further defined as adjusting the flow control device of the first control valve to establish the flow rate of the resin component to between 5 and 70 gallons per minute and adjusting the flow control device of the second control valve to establish the flow rate of the isocyanate component to between 5 and 70 gallons per minute.

10. A method as set forth in claim 9 wherein adjusting the flow control devices of the first and second control valve includes adjusting one of the flow control devices relative to the other flow control device to achieve a predetermined ratio of flow rates of the resin component and the isocyanate component.

11. A method as set forth in claim 9 further including a first tank holding a supply of the resin component coupled to the first control valve and a second tank holding a supply of the isocyanate component coupled to the second control valve and wherein pressurizing the at least one of the resin component and the isocyanate component includes pressurizing the first tank to move the resin component through the first control valve and pressurizing the second tank to move the isocyanate component through the second control valve.

12. A method as set forth in claim 11 wherein pressurizing the at least one of the first and second tanks is further defined as pressurizing the at least one of the first and second tanks to between 100 and 500 pounds per square inch.

13. A method as set forth in claim 11 wherein the source of gas pressure is further defined as a source of compressed air.

14. A method as set forth in claim 1 further including a first tank holding a supply of the resin component and a second tank holding a supply of the isocyanate component and wherein pressurizing the at least one of the resin component and the isocyanate component includes pressurizing at least one of the first and second tanks with the source of gas pressure.

15. A method as set forth in claim 14 wherein pressurizing the at least one of the first and second tanks is further defined as pressurizing the at least one of the first and second tanks to between 100 and 500 pounds per square inch.

16. A method as set forth in claim 14 wherein pressurizing the at least one of the first and second tanks is further defined as pressurizing the at least one of the first and second tanks to between 220 and 250 pounds per square inch.

17. A method as set forth in claim 14 wherein the source of gas pressure is further defined as a source of compressed air.

18. A method as set forth in claim 1 wherein the resin component is further defined as a polyol component.

19. A method of forming a polyurethane foam from a resin component and an isocyanate component using a first control valve controlling a flow rate of the resin component and a second control valve controlling a flow rate of the isocyanate component, the control valves having a housing defining an inlet and an outlet chamber each coupled to a line and spaced from each other with the outlet chamber disposed along an outlet axis with the housing receiving one of a plurality of interchangeable flow control devices each configured to define a fluid passage in fluid communication with the inlet and outlet chambers and extending along a plane intersecting the outlet axis and each configured to provide a different selected range of flow rates through the flow control device, said method comprising:

coupling a source of gas pressure to the first and second control valves;

pressurizing the resin component with 100 to 500 pounds per square inch of pressure with the source of gas pressure to move the resin component into the first control valves;

pressurizing the isocyanate component with 100 to 500 pounds per square inch of pressure with the source of gas pressure to move the isocyanate component into the second flow control device;

adjusting the flow control device along the plane while the lines are coupled to the inlet and outlet chambers to vary the fluid communication between the fluid passage and at least one of the inlet and outlet chambers to establish the flow rate of each of the resin component and the isocyanate component to between 5 gallons per minute and 70 gallons per minute; and coupling one of the plurality of interchangeable flow control devices with the housing to limit the flow rate through the housing to be within one of the selected ranges of flow rates.

20. A method as set forth in claim 19 further including uncoupling one of the interchangeable flow control devices from the housing and coupling of the another interchangeable flow control device with the housing to limit the flow rate through the housing to be within the another selected range of flow rates.

21. A method as set forth in claim 20 wherein uncoupling one of the interchangeable flow control devices and coupling another of the interchangeable flow control device are performed while the lines are coupled to the inlet and outlet chambers.

22. A method as set forth in claim 19 wherein adjusting the flow control device is further defined as adjusting the flow rate of the flow control device within the selected range of flow rates.

23. A method as set forth in claim 19 wherein adjusting the flow control devices of the first and second control valves includes adjusting one of the flow control devices relative to the other flow control device to achieve a predetermined ratio of flow rates of the resin component and the isocyanate component.

24. A method as set forth in claim 19 further including a first tank holding a supply of the resin component coupled to the first control valve and a second tank holding a supply of the isocyanate component coupled to the second control valve and wherein pressurizing the resin component is further defined as pressurizing the first tank and wherein pressurizing the isocyanate component is further defined as pressurizing the second tank.

25. A method as set forth in claim 19 wherein the resin component is further defined as a polyol component.

* * * * *